United States Patent [19]

Patrick

[11] 3,751,806

[45] Aug. 14, 1973

[54] TAPE CUTTER

[76] Inventor: John Patrick, 233 N. Ward St., Macomb, Ill. 61455

[22] Filed: May 20, 1971

[21] Appl. No.: 145,432

[52] U.S. Cl. .................................... 30/294, 30/315
[51] Int. Cl. .............................................. B26b 3/08
[58] Field of Search ...................... 30/294, 314, 315

[56] References Cited
UNITED STATES PATENTS

| 3,230,620 | 1/1966 | Embleton | 30/294 X |
| 2,610,399 | 9/1952 | Adams et al. | 30/294 X |
| 1,131,141 | 3/1915 | Kaleborn | 30/294 |
| 3,673,687 | 7/1972 | Phillips et al. | 30/394 |

FOREIGN PATENTS OR APPLICATIONS 736,341  9/1955  Great Britain

Primary Examiner—James L. Jones, Jr.
Attorney—Wm. T. Metz

[57] ABSTRACT

A tape cutter for cutting adhesive tape from human skin having a pointed blade positioned so that the point of the blade is near a rounded tip on the tape cutter. The blade being held in a guide extension that has an open area above the blade to force the tape to be cut against the blade and a bottom rounded portion to force the skin down and away from the tape to be cut.

1 Claim, 3 Drawing Figures

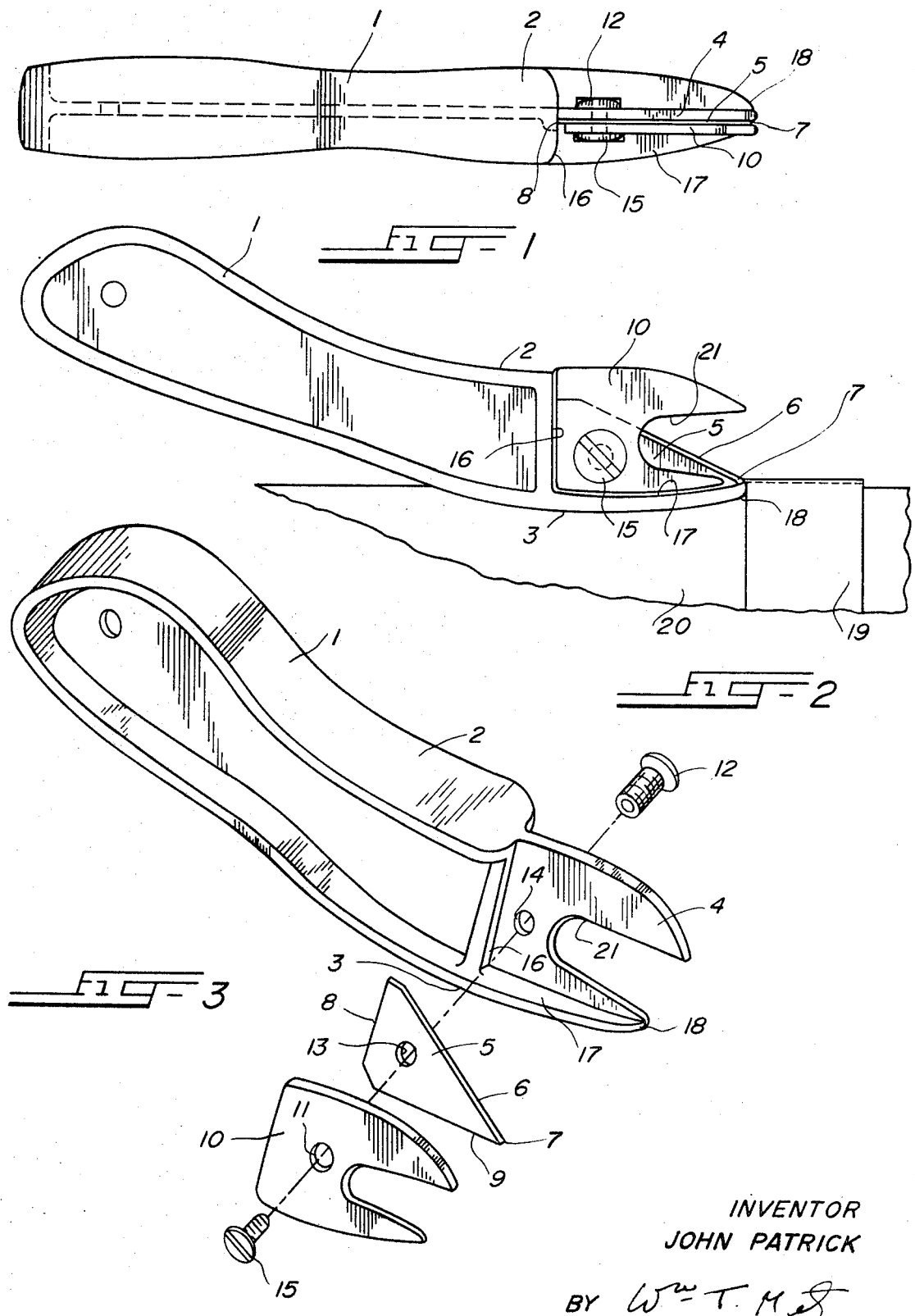

TAPE CUTTER

BACKGROUND OF THE INVENTION — FIELD OF THE INVENTION

This invention pertains to tape cutters and more particularly to a tape cutter which will cut tape from various portions of the body by pushing the tape cutter between the skin and the tape, thus cutting the tape and dividing the tape into two sections which may be removed from the body.

BACKGROUND OF THE INVENTION - DESCRIPTION OF THE PRIOR ART

Heretofore tape cutters which have been used to cut tape from the human body have been such instruments as scissors, knives and the like. No tape cutter, however, has been invented which may be pushed under the tape to be cut and by the pushing motion cut the tape while protecting the skin from the sharp point of the blade or sharp instrument used as the tape cutter.

SUMMARY OF THE INVENTION

The tape cutter herein described provides a means to cut tape from all surfaces of the human body for removal after the tape has been cut. The tape cutter may be used around highly irregular surfaces such as on the ankle.

Therefore, an object of this invention is to provide a tape cutter which may be pushed under tape placed on various areas of the body either for support or medical purposes so the tape may be removed.

It is a further object of this invention to provide a tape cutter that has a rounded tip which may be easily forced under the tape to be cut and moved smoothly along irregular surfaces on the skin.

It is a further object of this invention to provide a tape cutter which will force the tape against the blade held in the tape cutter.

It is a futher object of this invention to provide a tape cutter wherein the blade held therein is shouldered against the handle and thus held firmly in place to be forced against the tape to be cut.

It is a further object of this invention to provide a tape cutter which has a blade having a cutting edge extending to the forward tip of the tape cutter so as to cut the tape from the skin with the minimum of pull.

Further objects and advantages of this invention will become apparent from the following drawings, description and claims.

BRIEF DESCRIPTION OF THE DRAWINGS

FIG. 1 is a top view of the tape cutter. FIG. 2 is a plan view of the tape cutter showing it in position to cut tape from the skin. FIG. 3 is an exploded view of the taper cutter showing the various parts as they are disassembled and the manner in which they may be assembled.

DESCRIPTION OF THE PREFERRED EMBODIMENT

Referring now to the drawings, the tape cutter has a handle 1 having a thumb rest 2 and a bottom rounded portion 3. The handle 1 has a guide extension 4. A blade 5 has a cutting edge 6, a point 7, a back edge 8, and a bottom edge 9. A guide piece 10 has a hole 11 therein through which a nut 12 may be inserted. Hole 13 in the blade 5 and hole 14 in the guide extension 4 also receive the nut 12. The tape cutter is assembled by placing the blade 5 against the guide extension 4 and placing the guide piece 10 against the blade 5 with the holes 11, 13 and 14 in alignment so that the nut 12 may fit through the holes 11, 13 and 14 and the screw 15 may be screwed into the nut 12 to hold the blade 5 and the guide piece 10 firmly on the guide extension 4.

The back edge 8 of the blade 5 fits against the shoulder 16 of the handle 1 and the bottom edge 9 of the blade 5 fits against lip 17 of the handle 1. The blade 5 is thereby held firmly in position so that the point 7 of the blade 5 extends to the rounded tip 18 of the guide extension 4.

The tape cutter is used to remove tape 19 from various portions of the body. The rounded tip 18 is forced under the tape 19. The bottom rounded portion 3 of the handle 1 forces the skin 20 down to allow the rounded tip 18 to slip under the tape 19 The point 7 of the cutting edge 6 of the blade 5 then cuts the tape 19 as the tape cutter is forced under the tape 19 and between the tape 19 and the skin 20. If the tape 19 should build up so that the leading edge of the tape 19 is not cut at the point 7 of the blade 5 it will be cut by being forced against the cutting edge 6 of the blade 5 in the area where the cutting edge 6 of the blade 5 intersects with the underneath edge 21 of the guide extension 4 and the guide piece 9.

In taping the ankles of athletes the tape is usually placed on the leg above he ankle bone and on the foot below the ankle bone. The tape cutter herein described is particularly useful in cutting this type of a taping of the ankle, but may also be used for removal of tape from other portions of the body.

I claim:

1. A tape cutter having a handle, a guide extension on the handle, a guide piece, a blade having a back edge and a bottom edge fastened between the guide extension and the guide piece so that the back edge of the blade fits against a shoulder on the handle and the bottom edge of the blade fits against a lip on the guide extension, the guide extension having an underneath edge above the blade, the handling having a bottom rounded portion near the guide extension and the blade having a point extending to the edge of a rounded tip on the lip of the guide extension.

* * * * *